L. Hull.
Whipstock.
No. 3,754. Reissued Nov. 30, 1869.
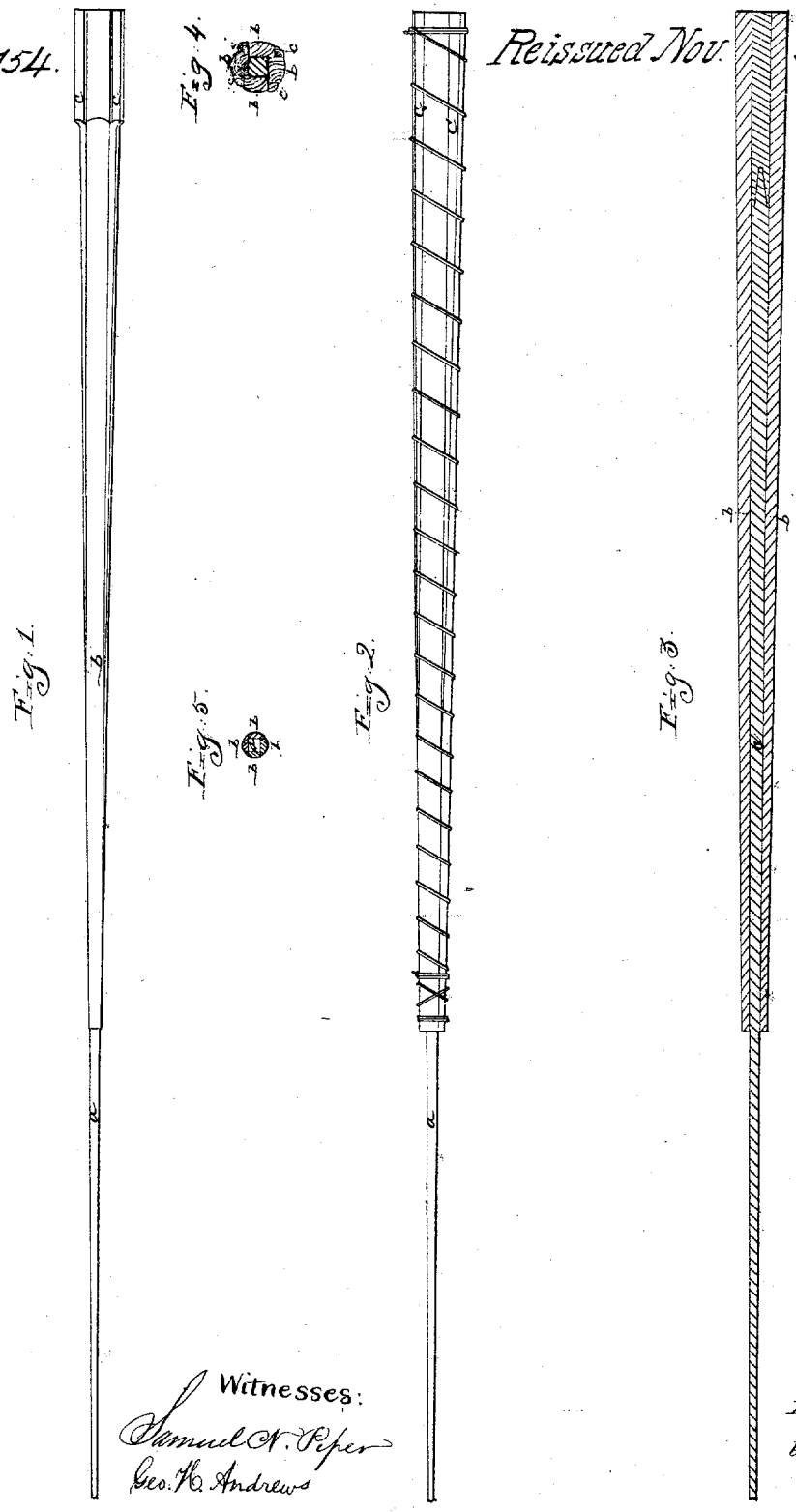
Witnesses:
Samuel N. Piper
Geo. H. Andrews
Inventor:
Ziveras Hull
by his attorney
R. H. Eddy
N. PETERS, PHOTO-LITHOGRAPHER, WASHINGTON, D. C.

United States Patent Office.

LIVERUS HULL, OF CHARLESTOWN, MASSACHUSETTS.

*Letters Patent No.* 61,070, *dated January* 8, 1867; *reissue No.* 3,754, *dated November* 30, 1869.

IMPROVEMENT IN THE MANUFACTURE OF WHIPSTOCKS.

The Schedule referred to in these Letters Patent and making part of the same.

*To all whom it may concern:*

Be it known that I, LIVERUS HULL, of Charlestown, county of Middlesex, and State of Massachusetts, have invented an Improved Whipstock; and do hereby declare the following to be a full, clear, and exact description thereof, due reference being had to the accompanying drawings, making part of this specification, and in which—

Figure 1 is a side view of a whipstock, as it appears after it is turned down, or completed, ready for being smoothed, preparatory to being covered.

Figure 2 is a side view of the stock, preparatory to being turned or reduced.

Figure 3 is a longitudinal section of it.

Figure 4 is a transverse section of it, near its but or larger end.

Figure 5 is a transverse section of it, at its middle.

In making this whipstock, I take a long shaft or strip of whalebone, *a*, for the heart-piece, extending beyond the fasces of rattan employed to encompass it.

The said strip *a*, I usually make square or polygonal in section. In fact, it should be as near a regular polygon in section as possible.

To each of the faces or sides of the tapering heart-piece *a*, I apply and glue a long strip, *b*, of rattan, of a greater width than that of that side of the heart-piece on which it is to be fixed, the arrangement of the strip or rattan being so as to cause it to project beyond the face of the heart-piece, in the plane thereof, and lap in such plane, on the edge of the next adjacent strip of rattan.

The two strips of rattan, where they lie against one another, are also to be glued together.

This arrangement of the rattan and the heart-piece is particularly shown in figs. 4 and 5 of the accompanying drawings.

When the rattan strip is not wide enough to complete the stock, near its but, I apply and glue between and to the strips, enlargement-pieces or strips *c c c c* of rattan, so as to fill the recesses or angular spaces between the contiguous strips.

When necessary, there may be placed in the but or handle part of the stock, a handle heart-piece, separate from, and so as to extend from the whalebone heart-piece *a*, such being polygonal in section, and being composed of metal, or other suitable material, and added prior to the application of the rattan strips.

To all the surfaces in contact, I apply glue, and set them firmly together, by tightly winding a rope or cord about them, in vertical coils.

After the stock may have thus been made, and the glue become set or hard, the rope should be removed, and the wooden part of the stock turned or reduced to a conic frustum, by any suitable turning-lathe.

Whipstocks, made of a whalebone centre-piece or strip, surrounded with strips or pieces of rattan, held together by pitch, and reduced to the proper tapering shape by a hand-plane, applied lengthwise, from but to tip, were in existence prior to my present invention.

My invention consists in arranging the outside strips or layers of rattan, about the centre-piece, by extending or projecting them laterally beyond the several faces or corners of the centre-piece, so that each strip of rattan, when secured, by glue or cement, to such central piece, is held so as to resist the tension attending the use of a turning-lathe, or other machine-tool cutting transversely.

In this way, I am enabled to give the requisite tapering shape to the whipstock, by a lathe or machine-tool, and thus to operate more speedily and economically than by the use of a hand-plane, as above described.

*Claims.*

What, therefore, I claim as my invention, and desire to secure by Letters Patent of the United States, is as follows:

1. In a whipstock, composed of a centre-piece of one material, surrounded by several outside pieces or strips, the mode of producing the requisite shape or taper therein, by a turning-machine, the said process consisting of first butting each outside strip laterally against its contiguous strip, securing them together by glue, substantially as above described, and afterward turning the same into proper shape by tools working transversely, without disarrangement of its several pieces or parts.

2. The improved whipstock, when arranged and turned substantially as described.

LIVERUS HULL.

Witnesses:
FRED. CURTIS,
EDWARD GRIFFITH.